United States Patent
Maeng

(10) Patent No.: US 11,328,717 B2
(45) Date of Patent: May 10, 2022

(54) ELECTRONIC DEVICE, OPERATING METHOD THEREOF, SYSTEM HAVING PLURAL ARTIFICIAL INTELLIGENCE DEVICES

(71) Applicant: LG ELECTRONICS INC., Seoul (KR)

(72) Inventor: Jichan Maeng, Seoul (KR)

(73) Assignee: LG ELECTRONICS INC., Seoul (KR)

(*) Notice: Subject to any disclaimer, the term of this patent is extended or adjusted under 35 U.S.C. 154(b) by 366 days.

(21) Appl. No.: 16/489,274

(22) PCT Filed: Apr. 18, 2019

(86) PCT No.: PCT/KR2019/004673
§ 371 (c)(1),
(2) Date: Aug. 27, 2019

(87) PCT Pub. No.: WO2020/213762
PCT Pub. Date: Oct. 22, 2020

(65) Prior Publication Data
US 2021/0366473 A1 Nov. 25, 2021

(51) Int. Cl.
*H04L 69/22* (2022.01)
*G10L 15/24* (2013.01)
(Continued)

(52) U.S. Cl.
CPC .............. *G10L 15/22* (2013.01); *G10L 15/08* (2013.01); *H04L 67/30* (2013.01); *G06N 20/00* (2019.01);
(Continued)

(58) Field of Classification Search
USPC ............... 704/1–10, 200–278; 382/153–160; 381/300–310, 58–63, 317–318, 91–110
See application file for complete search history.

(56) References Cited

U.S. PATENT DOCUMENTS 10,902,851 B2 * 1/2021 Kline ...................... G06F 3/167
2014/0156281 A1 6/2014 Boyd et al.
(Continued)

FOREIGN PATENT DOCUMENTS

KR 10-2010-0134469 A 12/2010
KR 10-2019-0016260 A 2/2019

*Primary Examiner* — Marcellus J Augustin
(74) *Attorney, Agent, or Firm* — Birch, Stewart, Kolasch & Birch, LLP

(57) ABSTRACT

The present disclosure relates to an electronic device, an operating method thereof, and a system including a plurality of artificial intelligence devices. An electronic device according to the present invention includes a voice receiving unit configured to receive a voice, a communication unit configured to perform communication with an artificial intelligence (AI) server set to be activated by a preset wake-up word, and a control unit configured to acquire profile information through communication with at least one artificial intelligence device communicating with the artificial intelligence server, and register the at least one artificial intelligence device by storing the acquired profile information and a list of executable commands matched to the profile information. The control unit searches for an artificial intelligence device to perform an execution command based on the profile information and the list and transmits the execution command to the searched artificial intelligence device, in response to the voice including the preset wake-up word being received by the registered artificial intelligence device and the execution command corresponding to the voice being received from the registered artificial intelligence device.

11 Claims, 13 Drawing Sheets

(51) Int. Cl.
  *H04W 8/18*    (2009.01)
  *H04W 8/22*    (2009.01)
  *G10L 15/22*   (2006.01)
  *G10L 15/08*   (2006.01)
  *H04L 67/30*   (2022.01)
  *G06N 20/00*   (2019.01)

(52) U.S. Cl.
  CPC .. *G10L 2015/088* (2013.01); *G10L 2015/223* (2013.01)

(56) References Cited

U.S. PATENT DOCUMENTS

| | | | |
|---|---|---|---|
| 2015/0032456 A1 | 1/2015 | Wait | |
| 2018/0096690 A1* | 4/2018 | Mixter | G10L 21/0216 |
| 2019/0005960 A1* | 1/2019 | Naravanekar | G10L 15/22 |
| 2019/0057684 A1* | 2/2019 | Roh | G10L 15/22 |

* cited by examiner

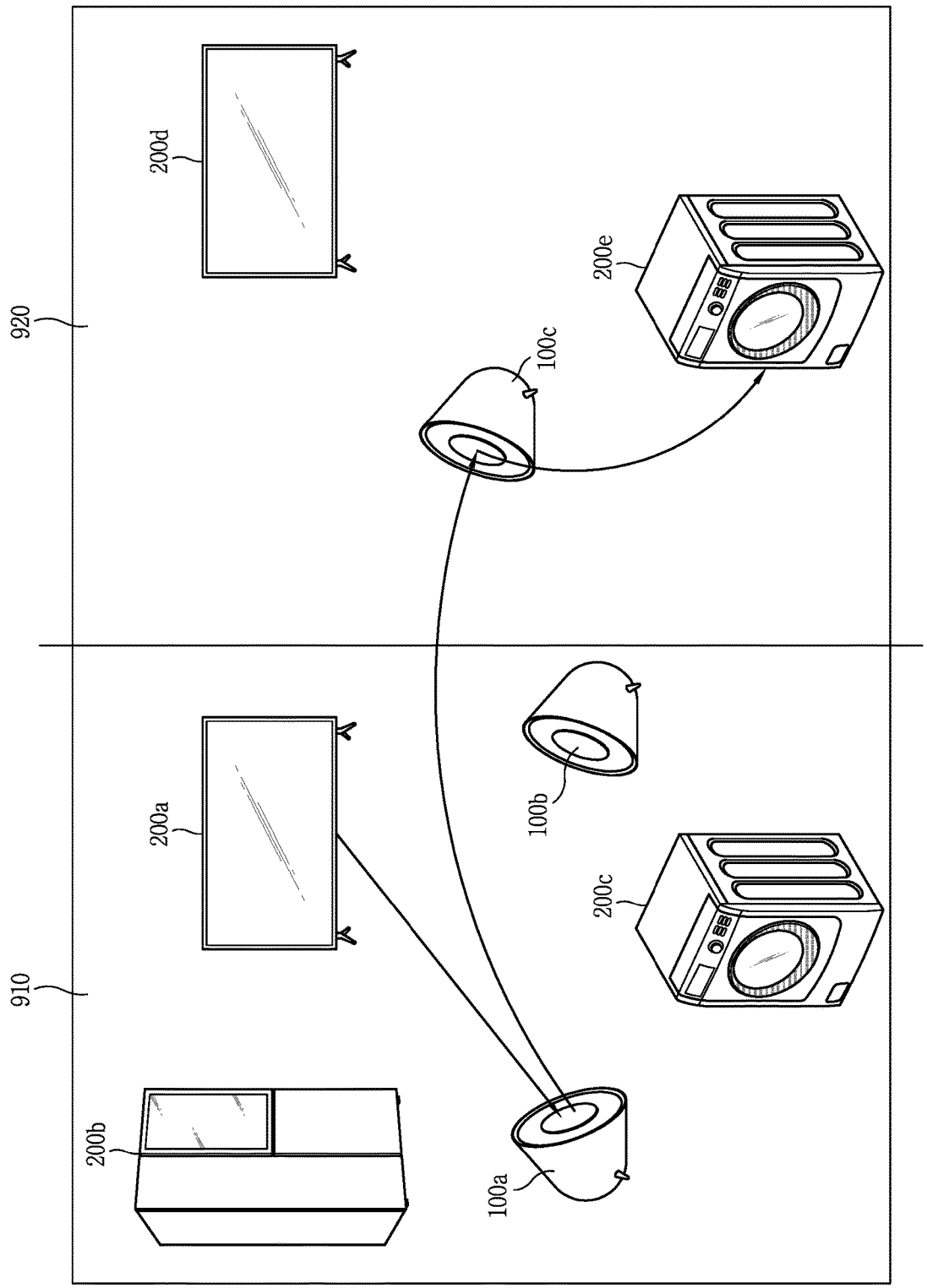

ELECTRONIC DEVICE, OPERATING METHOD THEREOF, SYSTEM HAVING PLURAL ARTIFICIAL INTELLIGENCE DEVICES

CROSS REFERENCE TO RELATED APPLICATIONS

This application is the National Phase of PCT International Application No. PCT/KR2019/004673, filed on Apr. 18, 2019, all of which is hereby expressly incorporated by reference into the present application.

FIELD

The present disclosure relates to an electronic device that performs communication with a plurality of artificial intelligence devices, which is capable of processing a user voice based on an artificial intelligence technology by receiving the user voice, an operating method thereof, and a system having the plurality of artificial intelligence devices.

BACKGROUND

Along with the recent development of hardware, artificial intelligence technologies which realize human thought processes, that is, cognition, reasoning, learning, etc., by use of computing technologies are being dramatically developed.

An artificial intelligence technology itself is a subject to be researched, and also is combined indirectly with other fields of a computer science to provide various functions. Particularly, there are many active attempts to introduce artificial intelligence elements in various fields of information technologies to solve problems in the fields.

Artificial intelligence technologies are classified into strong artificial intelligence and weak artificial intelligence. Strong artificial intelligence is a technology that can make human-like thinking and decision, and is a technology that performs self-learning and self-judgment. Weak artificial intelligence is a technology that provides optimal solutions by performing cognitive processes such as perception, reasoning, etc. through a computation model.

As part of such technology development, attempts are increasing to apply artificial intelligence technologies to electronic devices, which are most familiar to users, so as to provide various functions.

In particular, researches have been actively conducted in relation to further extension of an application range of artificial intelligence technologies by connecting an electronic device to another device. For example, other devices may be connected based on a user voice received in an electronic device, and an input of a control command for such connected devices may be performed by the electronic device.

For example, such an electronic device may be connected to other devices having artificial intelligence technologies applied, for example, various home appliances employing the artificial intelligence technologies (hereinafter, referred to as 'artificial intelligence devices'), so that control commands for the artificial intelligence devices can be input through the electronic device.

However, up to now, a user voice had to be uttered to an electronic device or an artificial intelligence device that the user wanted to control. Accordingly, the user had inconvenience in view of having to move to a position where the electronic device is located or an artificial intelligence device to control is located or having to perform an additional operation using other elements such as a terminal and the like.

DISCLOSURE

Technical Problem

In order to solve the aforementioned problems, one aspect of the present disclosure is to provide an electronic device, by which a user can perform control for a specific artificial intelligence device without having to consider type and position of the electronic device or a home appliance to control, an operating method thereof, a system having a plurality of artificial intelligence devices.

Another aspect of the present disclosure is to provide an electronic device, by which a user can control a specific artificial intelligence device through voice and confirm a control result, without having to move from a current position in a space where a plurality of artificial intelligence devices is used, an operating method thereof, and a system having a plurality of artificial intelligence devices.

Still another aspect of the present disclosure is to provide an electronic device, by which a user can search for an appropriate artificial intelligence device, even without clearly designating a device to control, in a space where a plurality of artificial intelligence devices is used, an operating method thereof, and a system having a plurality of artificial intelligence devices.

Technical Solution

An electronic device according to the present disclosure to solve those problems may include a voice receiving unit configured to receive a voice, a communication unit configured to perform communication with an artificial intelligence (AI) server set to be activated by a preset wake-up word, and a control unit configured to acquire profile information through communication with at least one artificial intelligence device communicating with the artificial intelligence server, and register the at least one artificial intelligence device by storing the acquired profile information and a list of executable commands matched to the profile information. The control unit, in response to a voice including the preset wake-up word being received by the registered artificial intelligence device and an execution command corresponding to the voice being received from the registered artificial intelligence device, may search for an artificial intelligence device to perform the execution command based on the profile information and the list, and transmit the execution command to the searched artificial intelligence device.

In one embodiment, the control unit may receive profile information related to at least one artificial intelligence device existing within a predetermined area, and store the profile information and a list of executable commands matched to the profile information, in response to a main body being selected as a master device according to a preset reference.

In one embodiment, the transmission of the execution command may not be performed when it is determined that the voice including the preset wake-up word is received by the registered artificial intelligence device and the corresponding artificial intelligence device is capable of performing the execution command corresponding to the voice.

In one embodiment, the control unit may transmit the execution command to an artificial intelligence device close to a current position of a user so that the artificial intelligence device performs the execution command when a plurality of artificial intelligence devices to perform the execution command is searched for.

In one embodiment, the control unit may receive result information related to an operation corresponding to the execution command from the searched artificial intelligence device after the execution command is transmitted to the searched artificial intelligence device.

In one embodiment, the control unit may transmit the result information to an artificial intelligence device that has transmitted the execution command corresponding to the voice.

In one embodiment, the control unit may transmit the execution command to the searched artificial intelligence device by attaching profile information related to a first artificial intelligence device, which has transmitted the execution command corresponding to the voice, to a first packet including the execution command, and control a second artificial intelligence device, which has received the first packet, to transmit its own profile information to the first artificial intelligence device by attaching its own profile information to a second packet including result information related to an operation corresponding to the execution command.

In one embodiment, when the voice including the preset wake-up word is received by a plurality of artificial intelligence devices, one of the plurality of artificial intelligence devices may be selected based on a comparison result of voice reception states, and the execution command corresponding to the voice may be received from the selected artificial intelligence device.

In one embodiment, when a plurality of different voices including the preset wake-up word is received, a plurality of execution commands corresponding to the respective voice may be transmitted from a plurality of artificial intelligence devices that are close to respective users who have spoken the plurality of different voices, and the control unit may transmit the plurality of execution commands to the searched artificial intelligence device by adding identifications (IDs) for a plurality of artificial intelligence devices matched the plurality of execution commands, respectively.

In addition, a system including a plurality of artificial intelligence devices according to an embodiment of the present disclosure may include an artificial intelligence server set to be activated by a preset wake-up word, a plurality of artificial intelligence devices configured to receive a voice including the preset wake-up word, and a master electronic device configured to acquire profile information related to the plurality of artificial intelligence devices through communication with the plurality of artificial intelligence devices, and register the plurality of artificial intelligence devices by storing the acquired profile information and a list of executable commands matched to the profile information. The master electronic device may search for at least one artificial intelligence device to perform an execution command based on the profile information and the list and transmit the execution command to the searched artificial intelligence device, in response to a voice including the preset wake-up word being received by one of the plurality of registered artificial intelligence devices and the execution command corresponding to the voice being received from the one artificial intelligence device.

In one embodiment, the system may further include a slave electronic device configured to acquire profile information related to the plurality of artificial intelligence devices through communication with the plurality of artificial intelligence devices. At least one artificial intelligence device to perform the execution command may be searched for by receiving the stored profile information and list from the master electronic device when the execution command corresponding to the voice is transferred to the slave electronic device. The slave electronic device may receive result information related to an operation corresponding to the execution command from the searched artificial intelligence device and transmit the result information to the master electronic device.

In one embodiment, the execution command may be transmitted to a master electronic device in another network area, when the master electronic device cannot search for at least one artificial intelligence device to perform the execution command based on the stored profile information and list.

In addition, a method for operating an electronic device according to an embodiment of the present disclosure may include acquiring profile information by communicating with at least one artificial intelligence device, registering the at least one artificial intelligence device by storing the acquired profile information and a list of executable commands matched to the profile information, receiving an execution command corresponding to a voice including a preset wake-up word from the at least one artificial intelligence device when the voice is received by the at least one artificial intelligence device, searching for an artificial intelligence device to perform the execution command based on the profile information and the list, and transmitting the execution command to the searched artificial intelligence device.

Advantageous Effects

According to an electronic device, an operating method thereof, and a system including a plurality of artificial intelligence devices in accordance with embodiments of the present disclosure, in an environment in which a plurality of artificial intelligence devices coexists, a quick and easy control for a specific artificial intelligence device can be performed through a seamless voice command without a user having to consider type and position of an electronic device or a home appliance to control and additionally without the user having to designate a device to control clearly. Also, the user can confirm a control result through an artificial intelligence device close to the current position of the user, without a need to input a voice command directly to a specific artificial intelligence device or to move to input such voice command to a master device. This may result in further enhancing user convenience and usability of a plurality of artificial intelligence devices.

BRIEF DESCRIPTION OF THE DRAWINGS

FIG. 9B is a conceptual view illustrating a processing operation when an artificial intelligence device to perform an execution command is not detected in the same network area.

MODES FOR CARRYING OUT PREFERRED EMBODIMENTS

Figure 1:
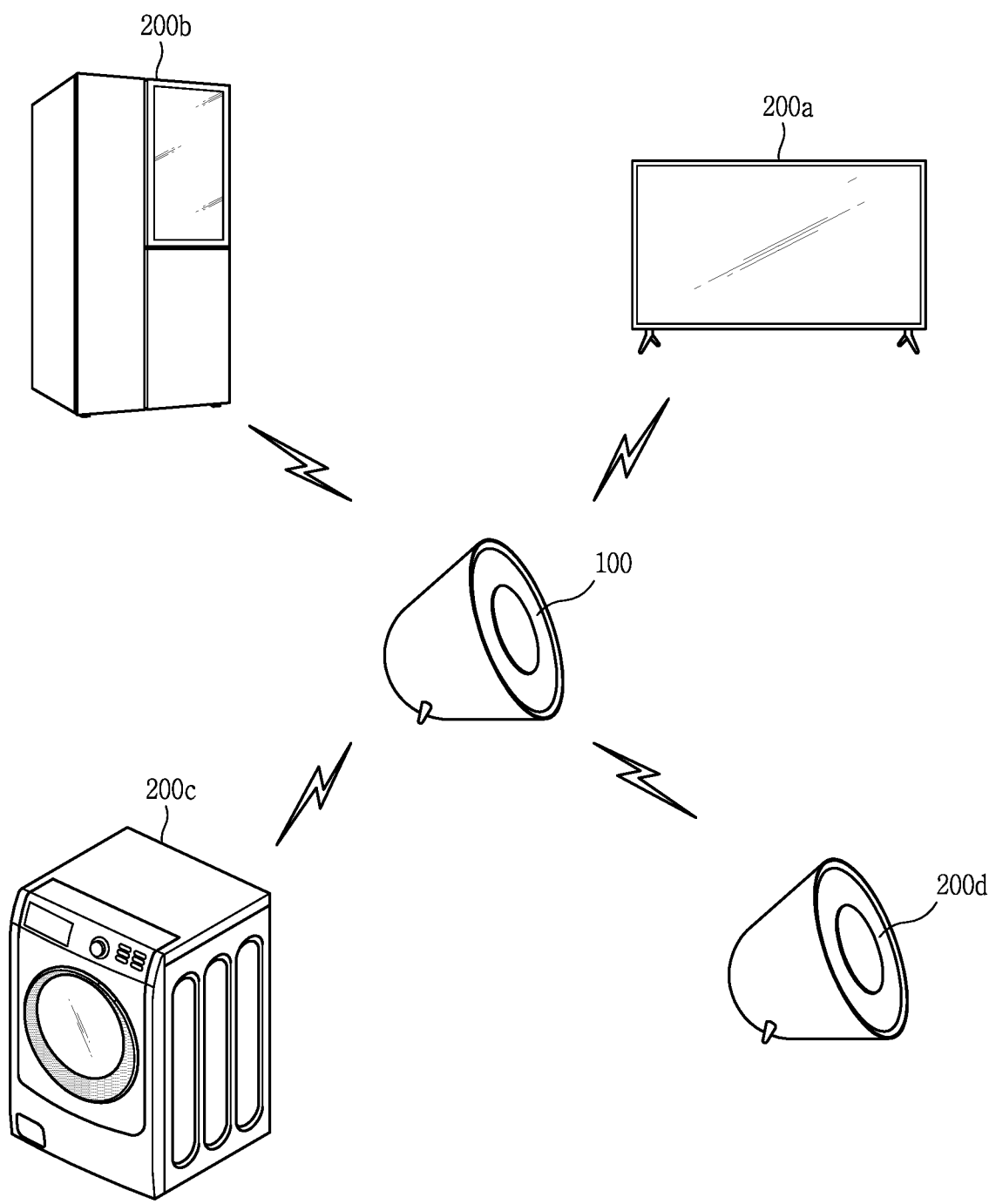
FIG. 1 is a conceptual view illustrating a state in which an electronic device according to the present disclosure performs communication with a plurality of artificial intelligence (AI) devices.

Hereinafter, embodiments of the present disclosure will be described in detail with reference to the accompanying drawings, and the same reference numerals are used to designate the same/like components and redundant description thereof will be omitted. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known technology or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of devices. Examples of such devices may include artificial intelligence (AI) speakers, cellular phones, smart phones, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of electronic devices. However, such teachings apply equally to other types of electronic devices, such as those types noted above. In addition, these teachings may also be applied to stationary terminals such as digital TV, desktop computers, digital signage, and the like.

Meanwhile, the 'electronic device' may be used in the same or similar meaning as 'artificial intelligence (AI) device' disclosed herein.

In addition, the 'artificial intelligence device' disclosed in the present specification may include all of electronic equipment, electronic devices, machines, and systems, to which artificial intelligence technologies are applied.

In addition, 'master equipment', 'master device', or 'master electronic device' disclosed herein refers to equipment or a device which has identification information regarding each of a plurality of devices and performs a function of controlling other devices except for itself.

In addition, 'slave equipment', 'slave device', or 'slave electronic device' disclosed herein refers to equipment or a device which performs a function of controlling itself, and a function of exchanging information when communicating with other devices.

FIG. 1 is a conceptual view illustrating a state in which an electronic device according to the present disclosure performs communication with a plurality of artificial intelligence (AI) devices.

As illustrated in FIG. 1, an electronic device 100 according to the present disclosure may be implemented in the form of a speaker.

In addition, the electronic device 100 according to the present disclosure may recognize a voice (speech) and execute a voice (speech) recognition function for controlling an operation of the electronic device 100 based on the recognized voice.

Here, the speech recognition function is a function for controlling the electronic device through voice, and may include a natural language processing function for analyzing a natural language, a question and answer function for presenting an answer to a question, and a voice processing function for converting a digital voice signal into a computer-processible language, an automatic translation and interpretation function for converting voice into multiple languages, and the like.

In addition, the electronic device 100 according to the present disclosure may be wirelessly connected to a plurality of artificial intelligence (AI) devices 200a, 200b, 200c, and 200d, for example, an AI TV, an AI refrigerator, an AI washing machine, and an AI speaker.

As such, when the electronic device 100 is connected to the plurality of AI devices 200a, 200b, 200c, and 200d, the operations of the plurality of AI devices 200a, 200b, 200c, and 200d may be controlled based on a voice recognized in the electronic device 100.

In addition, based on the voice recognized by the electronic device 100, the specific AI device 200a and another AI device 200c, for example, the AI TV and the AI washing machine may be controlled to be connected to the electronic device 100. In this case, the operation of the another AI device 200c may be controlled based on a voice command input to the electronic device 100 connected to the specific AI device 200a.

Furthermore, in the present disclosure, even when a voice command is not input to the electronic device 100 but is input to the specific AI device 200a, the operation of the another AI device 200c may be controlled via the electronic device 100. This will be described in more detail below.

Figure 2A:
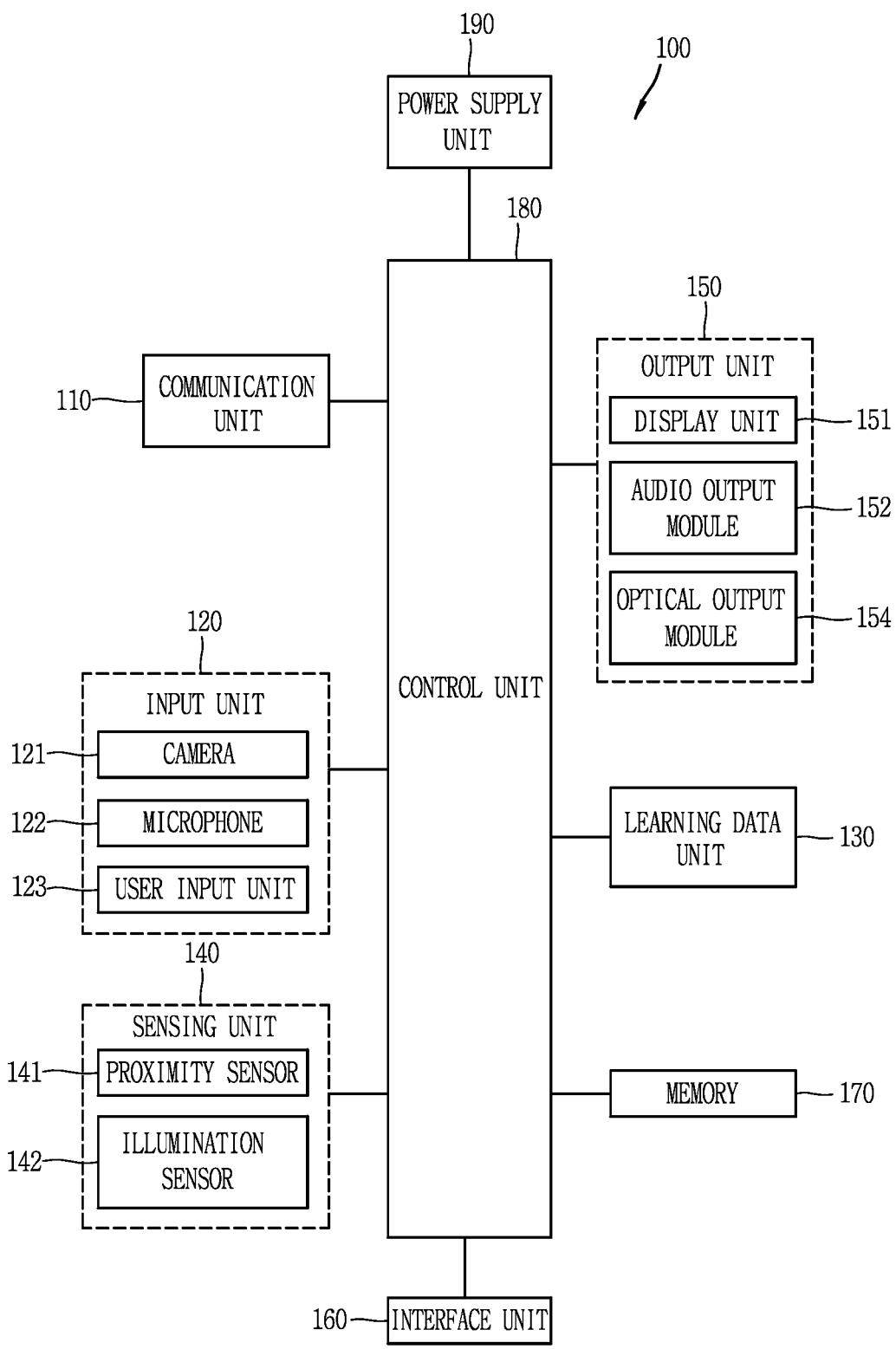
FIG. 2A is a block diagram illustrating a detailed configuration of an electronic device according to the present disclosure.
Figure 2B:
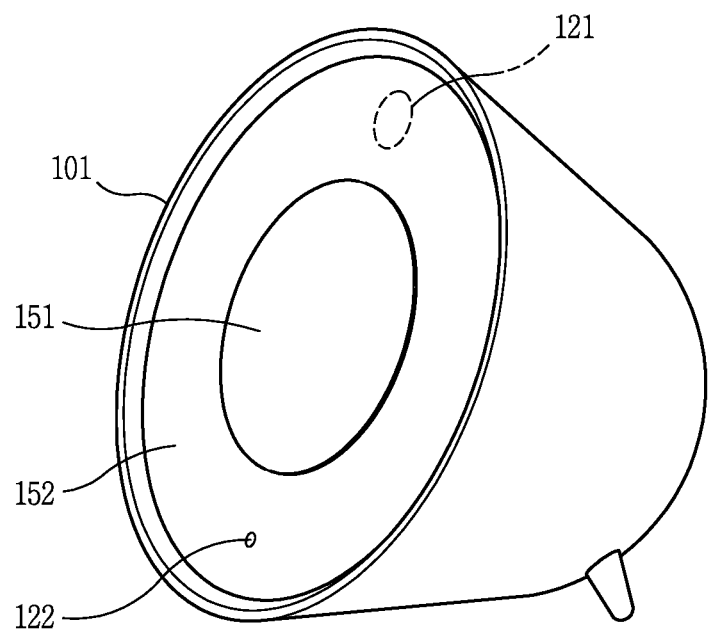
FIG. 2B is an exemplary conceptual view of the electronic device of FIG. 2A.

Hereinafter, FIG. 2A is a block diagram illustrating an electronic device according to the present disclosure, and FIG. 2B is an exemplary conceptual view of an electronic device according to the present disclosure, namely, an electronic device in the form of a speaker.

The electronic device 100 may be shown having components such as a wireless communication unit 11o, an input unit 120, a learning data unit 130, a sensing unit 140, an output unit 150, an interface unit 160, a memory 170, a controller (or control unit) 180, a power supply unit 190, and the like. Those components illustrated in FIG. 2A are not essential for implementing the electronic device, and the electronic device described in this specification may be provided with more or less components than the components listed above.

More specifically, the communication unit 110 among those components may include at least one module allowing wireless communication between the electronic device 100 and a wireless communication system, between the electronic device 100 and another electronic device 100, or the electronic device 100 and an external server, or between the electronic device 100 and a plurality of AI devices 200. In addition, the communication unit 110 may include at least one module that connects the electronic device 100 to at least one network.

The input unit 120 may include a camera 121 or an image input module for inputting a video signal, a microphone 122 or an audio input module for inputting an audio signal, a user input unit 123 (for example, a touch key, a mechanical key, etc.), and the like. The voice data or image data collected by the input unit 120 may be analyzed and processed as a user's control command.

The sensing unit 140 may include at least one sensor for sensing at least one of internal information related to the electronic device, surrounding environment information of the electronic device, and user information. For example, the sensing unit 140 may include a proximity sensor 141, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, the camera 121), a microphone 122, a battery gauge, an environment sensor (for example, a barometer, a hygrometer, a thermometer, a radiation detection sensor, a thermal sensor, and a gas sensor, among others), a chemical sensor (for example, an electronic nose, a health care sensor, a biometric sensor, and the like), and the like. Meanwhile, the electronic device disclosed herein may combine and use information sensed by at least two of those sensors.

The output unit 150 may include at least one of a display unit 151, an audio output module 152, and an optical output module 154 to generate an output related to visual information, auditory information, tactile information, or the like.

The display unit 151 may be interlayered or integrally formed with the touch sensor so as to realize a touch screen. The touch screen may function as the user input unit 123 for providing an input interface between the electronic device 100 and the user and simultaneously provide an output interface between the electronic device 100 and the user.

The interface unit 160 serves as an interface with various types of external devices that are coupled to the electronic device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the electronic device 100 may perform assorted control functions associated with a connected external device, in response to the external device being connected to the interface unit 160.

The memory 170 is typically implemented to store data to support various functions or features of the electronic device 100. The memory 170 may be configured to store application programs executed in the electronic device 100, data or instructions for operations of the electronic device 100, and the like. At least some of these applications may be downloaded from an external server through wireless communication.

The control unit 180 typically functions to control an overall operation of the electronic device 100, in addition to the operations associated with the application programs. The control unit 180 may provide or process appropriate information or functions to the user by processing signals, data, information, etc. input or output through the above-mentioned components or by activating application programs stored in the memory 170.

Also, the control unit 180 may control at least some of the components illustrated in FIG. 2A, to execute an application program that have been stored in the memory 170. In addition, the control unit 180 may control a combination of at least two of those components included in the electronic device 100 to activate the application program.

The learning data unit 130 may be configured to receive, classify, store, and output information to be used for data mining, data analysis, intelligent decision, and machine learning algorithms and technologies. The learning data unit 130 may include at least one memory unit configured to store information, which is received, detected, sensed, generated, or predefined through the terminal or information output through the terminal in different manners, or to store data which is received, detected, sensed, generated, predefined or output through other components, devices and terminals.

The learning data unit 130 may include a memory which is integrated or provided in the electronic device. In one embodiment, the learning data unit 130 may be implemented by the memory 170. However, the present disclosure is not limited thereto, and the learning data unit 130 may be implemented in a memory related to the electronic device 100 (for example, an external memory connected to the electronic device 100 (in a wired manner (or electrically)), or a memory included in a server that can communicate with the electronic device 100. In another embodiment, the learning data unit 130 may be implemented by a memory which is maintained in a cloud computing environment, or by another remote controllable memory which is accessible by a terminal through a communication method such as network communication.

The learning data unit 130 is generally configured to store data, which is to be used in supervised or unsupervised learning, data mining, predictive analysis or other machine learning technologies, in at least one database so as to identify, index, classify, manipulate, store, search for and output the data. Information stored in the learning data unit 130 may be used by the control unit 180, which uses at least one of different types of data analysis, machine learning algorithms, and machine learning technologies, or by a plurality of controllers (processors) included in the electronic device. Examples of such algorithms and technologies may include K-nearest neighbor systems, fuzzy logic (for example, possibility theory), neural networks, Boltzmann machines, vector quantization, pulsed neural nets, support vector machines, maximum margin classifiers, hill-climbing, inductive logic systems, Baysian networks, Petri nets (e.g., finite state machines, Mealy machines, Moore finite state machines, etc.), classifier trees (e.g., perceptron trees, support vector trees, Markov trees, decision tree forests, random forests, etc.), pandemonium models and systems, clustering, artificially intelligent planning, artificially intelligent forecasting, data fusion, sensor fusion, image fusion, reinforcement learning, augmented reality, pattern recognition, automated planning, and the like.

The control unit 180 may determine or predict executable operations of the electronic device based on information decided or generated using data analysis, machine learning algorithms, and machine learning technologies. For this, the control unit 180 may request, search, receive, or utilize data of the learning data unit 130. The control unit 180 may perform various functions for implementing a knowledge-based system, an inference system, a knowledge acquisition system, and the like, and may perform various functions including a system (e.g., a fuzzy logic system) for fuzzy inference, an artificial neural system, and the like.

The control unit 180 may also include sub modules, such as an I/O processing module, an environmental condition module, a speech-to-text (STT) processing module, a natural language processing module, a task flow processing module, a service processing module, and the like, which enable voice and natural language processing. Each of the sub modules may have access authority for at least one system or data and model, or its subset or superset in the electronic device. Here, subjects for which each of the sub modules has the access authority may include scheduling, a vocabulary index, user data, a task flow model, a service model, and an automatic speech recognition (ASR) system. In another embodiment, the control unit 180 or the electronic device may be implemented as the sub module, system, or data and model.

In some embodiments, on the basis of the data in the learning data unit 130, the control unit 180 may also be configured to detect and sense user's requirements, based on contextual conditions or user's intention represented by a user input or a natural language input. In addition, the control unit 180 may actively derive or obtain information necessary to completely determine what the user requires, according to contextual conditions or the user's intention. For example, the control unit 180 may detect and sense what the user requires by analyzing past data including past input and output, pattern matching, unambiguous words, input intent, and the like. In addition, the control unit 180 may determine a work flow for executing a function requested by a user according to a contextual condition or user's intention. In addition, the control unit 180 may execute a work flow for satisfying the user's requirement based on the contextual condition or the user's intention.

In some embodiments, the control unit 180 may include dedicated hardware components for learning data processes, which include memistor, memristors, transconductance amplifiers, pulsed neural circuits, AI nanotechnology systems (e.g., autonomous nanomachines), AI quantum mechanical systems (e.g., quantum neural networks), and the like. In some embodiments, the control unit 180 may include a pattern recognition system such as a machine vision system, an acoustic recognition system, a handwriting recognition system, a data fusion system, a sensor fusion system, and a soft sensor. A machine vision system may include content-based image retrieval, optical character recognition, augmented reality, egomotion, tracking, an optical flow, and the like.

The control unit 180 may detect or receive internal information regarding the electronic device, surrounding environment information around the electronic device, or other information through the sensing unit 140. In addition, the control unit 180 may receive a broadcast signal and/or broadcast related information, a wireless signal, wireless data, and the like through the wireless communication unit 110. In addition, the control unit 180 may receive image information (or a corresponding signal), audio information (or a corresponding signal), data, or user-input information, from the input unit.

The control unit 180 may collect information, and process or classify the information (for example, a knowledge graph, a command policy, a personalization database, a conversation engine, etc.). The control unit 180 may then store the processed or classified information in the memory 170 or the learning data unit 130.

When the operation of the electronic device is decided based on the data analysis, the machine learning algorithm, and the machine learning technology, the learning data unit 130 may control components of the electronic device to execute the decided operation. The control unit 180 may execute the decided operation by controlling the electronic device on the basis of a control command.

In one embodiment, when a specific operation is performed, the control unit 180 may analyze historical information indicating the performance of the specific operation through a data analysis, a machine learning algorithm and a machine learning technology, and update previously learned information based on the analyzed information. Accordingly, the control unit 180 may improve the accuracy of future performance of the data analysis, the machine learning algorithm, and the machine learning technology based on the updated data, together with the learning data unit 130.

Under the control of the control unit 180, the power supply unit 190 receives external power or internal power and supplies such power to the respective components included in the electronic device 100. The power supply unit 190 may include a battery, which may be an internal battery or a replaceable battery.

At least some of the respective components may cooperatively operate to implement operations, controls or control methods of the electronic device in accordance with various embodiments described below. In addition, the operations, controls, or control methods of the electronic device may be implemented on the electronic device by running at least one application program stored in the memory 170.

Subsequently, referring to FIG. 2B, an electronic device in the form of a speaker is shown as an example of the electronic device 100. And, FIG. 3 is a conceptual view illustrating an operation state of the electronic device 100 that executes a speech (voice) recognition function.

First, as illustrated in FIG. 2B, the speaker-type electronic device 100 may include a microphone 122, a speaker 152, and a display unit 151. A lighting function may be built in a frame 101 of the electronic device 100, and may be activated in the frame according to a predetermined input. In addition, the camera 121 may be provided on an outer surface of the electronic device 100 to obtain surrounding images.

Figure 3:
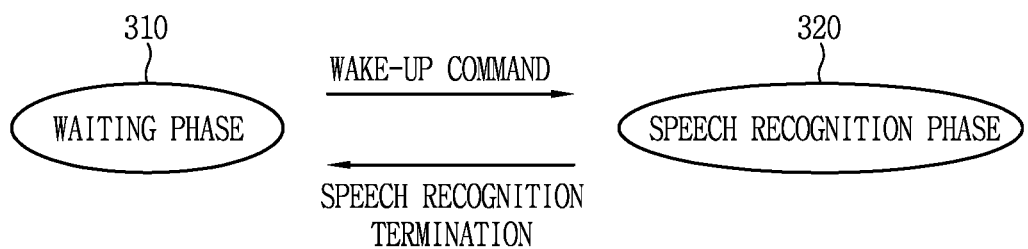
FIG. 3 is a conceptual view illustrating an operation state of an electronic device that executes a speech (voice) recognition function.

Referring to FIG. 3, the electronic device 100 may operate in one of a waiting phase 310 and a speech recognition phase 320.

The waiting phase 310 is a state for detecting whether or not a word (words) related to an execution of a speech recognition function is spoken near the electronic device before executing the speech recognition function. To this end, in the waiting phase 100, the control unit 180 of the electronic device 100 may monitor whether a sound over a specific loudness is continuously detected through the microphone 122.

Since a speech (or voice) analysis does not have to be performed in the waiting phase 310, low power, for example, currents of about 4.4 mA may be merely consumed. This waiting mode may also be termed "listening phase".

Meanwhile, in the waiting phase 310, when a sound of a specific volume or higher is detected through the microphone 122, the waiting phase 310 of the electronic device 100 may be switched to the voice recognition phase 320. Alternatively, when a predetermined wake-up word of a specific volume or higher is detected through the microphone 122, the waiting phase 310 of the electronic device 100 may be switched to the voice recognition phase 320.

Here, the wake-up word may include a predetermined voice command for waking up the electronic device 100 in the waiting mode, for example, a voice command such as "Hello", "Wake up", "Google", or the like.

The voice recognition phase 320 refers to a state in which the control unit 180 of the electronic device 100 analyzes a voice input through the microphone 122. Since the speech analysis is performed in the speech recognition mode, more currents are consumed than in waiting phase 210.

That is, before a preset wake-up word is received, the electronic device is in the waiting phase 210 in which the speech analysis is not performed, and thus the consumed currents can be reduced.

On the other hand, the control unit 180 of the electronic device 100 may determine whether or not a preset wake-up word for starting the speech recognition has been received in the speech recognition phase 320, before the speech analysis. In other words, the control unit 180 may start a speech analysis on the speech uttered after the preset wake-up word is received.

In the voice recognition phase 320, the operation of the electronic device 100 may be controlled by analyzing the voice input through the microphone 122. Such speech analysis may be performed using a separate third-party application installed in the electronic device.

In addition, the control unit 180 of the electronic device 100 may transmit voice information to a preset AI server or use data stored in the learning data unit 130 of the electronic device 100, in order to analyze the voice information through an AI algorithm.

Here, the preset AI server is a server that provides a function of learning a large amount of information using an AI algorithm and deriving optimal result information based on the learned information. Alternatively, the control unit 180 of the electronic device 100 may generate result information in response to input voice (or speech) information, based on data stored in the learning data unit 130.

In the above-described voice recognition mode, if a user's voice or a preset wake-up word is not received for a preset period of time, the voice recognition phase 320 may be switched back to the waiting phase 310.

Subsequently, the speaker 152 may output a response result of the input voice information. The response result may include not only a response (answer) to the input voice information, but also query or guide information for confirming ambiguous voice information or a search range.

In addition, the speaker 152 may output a preset notification sound when the voice recognition phase 320 is switched to the waiting phase 310 or the waiting phase 310 is switched to the voice recognition phase 320.

The display unit 151 may output a graphic object or image corresponding to the response result output through the speaker 152. Alternatively, when the speaker 152 is set to be on silent according to the setting of the electronic device 100, the response result to the input voice information may be output only through the display unit 151. Meanwhile, when the display unit 151 is configured as the aforementioned touch screen, the user and the electronic device 100 may interact with each other by controlling graphic objects or images based on various types of touch inputs.

The camera 121 may be detachably mounted to one side of the electronic device 100. Images acquired through the camera 121 may be used to identify a user corresponding to the voice information input through the speaker 152. Alternatively, the obtained images may be transmitted to another device according to a user request.

Meanwhile, the following description will be given based on the fact that the electronic device 100 is provided with the learning data unit 130 to output the analysis result of the input voice information. However, the present disclosure is not limited thereto, and the electronic device 100 may be implemented to receive a response corresponding to an analysis of voice information through communication with an AI server and operate based on the received response.

In addition, in the drawings and description below, the electronic device 100 is exemplarily described as being implemented in the form of a speaker for outputting voice, but the present disclosure is not limited thereto. The present disclosure may alternatively implement various type of electronic devices, for example, AI devices such as AI home appliances and the like.

Figure 4:
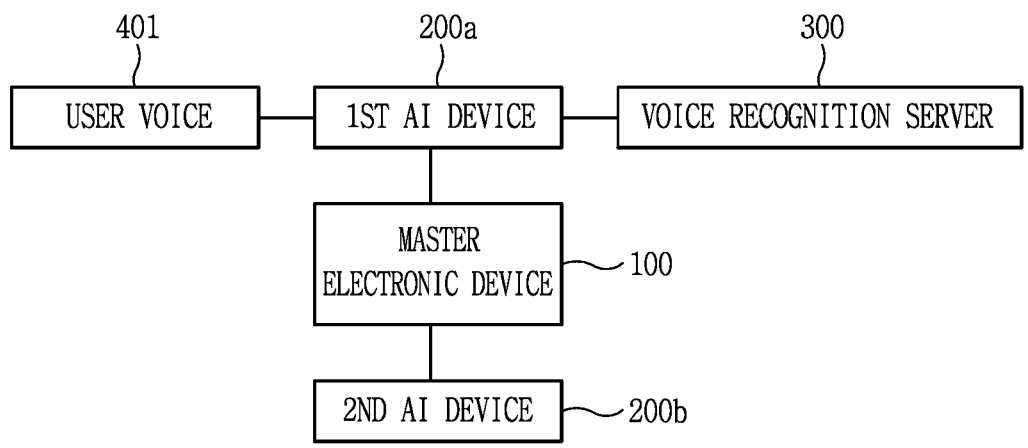
FIG. 4 is a conceptual view illustrating that an electronic device according to the present disclosure operates as a master device to transfer an execution command transmitted from a first artificial intelligence device to a second artificial intelligence device.

Continuously, FIG. 4 is a conceptual view illustrating that an electronic device according to the present disclosure operates as a master device to transfer an execution command transmitted from a first artificial intelligence device to a second artificial intelligence device.

Referring to FIG. 4, a plurality of artificial intelligence (AI) devices 200a and 200b may communicate with a master electronic device 100. In addition, the plurality of AI devices 200a and 200b may communicate with a voice recognition server 300 to analyze the meaning of a received user voice.

In an environment (hereinafter, 'the same network area') in which a plurality of AI devices exists, a user voice 401 is input to a first AI device 200a.

In this case, the first AI device 200a may be an AI device which is located close to the current location of the user. In addition, the user voice 401 includes a preset wake-up word. The first AI device 200a may transmit the received voice to the voice recognition server 300 and receive an execution command based on an analysis result of the meaning of the voice from the voice recognition server 300.

When the received execution command is related to the first AI device 200a, the corresponding execution command is executed in the first AI device 200a.

When the received execution command cannot be executed in the first AI device 200a, the first AI device 200a transmits the corresponding execution command to the master electronic device 100. Here, the master electronic device 100 may be one elected (selected) from among a plurality of electronic devices. Description of the election of the master electronic device will be given in more detail below.

The master electronic device 100 which has received the execution command transmits the execution command to a second AI device 200b which can execute the corresponding execution command. To this end, a list of executable commands (instructions) for all the AI devices existing in the same network area may be stored in the memory of the master electronic device 100.

The master electronic device 100 searches for the second AI device 200b which can execute the execution command received from the first AI device 200a based on the list of executable commands.

The second AI device 200b executes the execution command received from the master electronic device 100. In addition, result information regarding the execution may be transmitted to the master electronic device 100.

Figure 5:
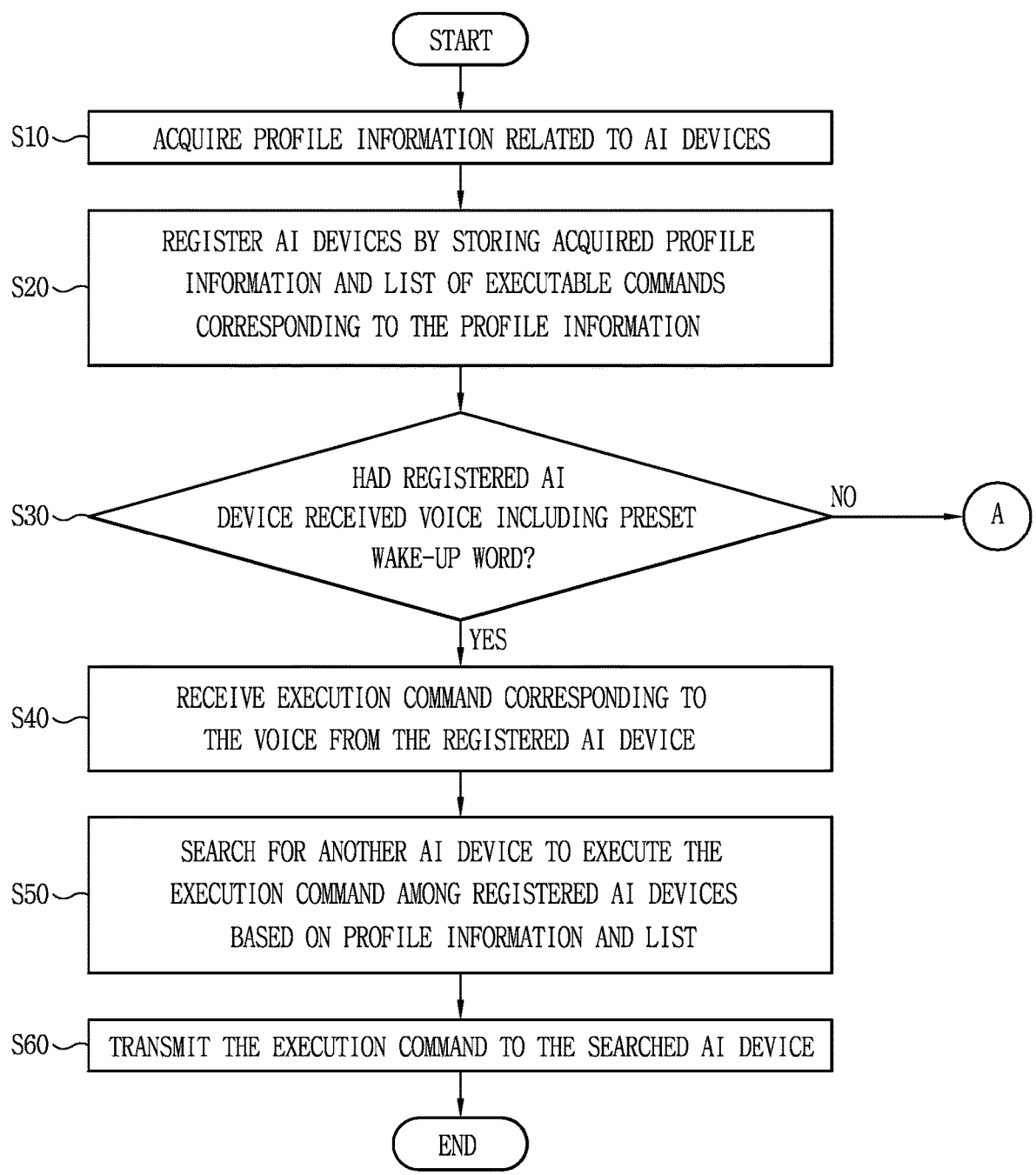
FIG. 5 is a representative flowchart illustrating a method of operating an electronic device in accordance with an embodiment of the present disclosure.
Figure 6A:
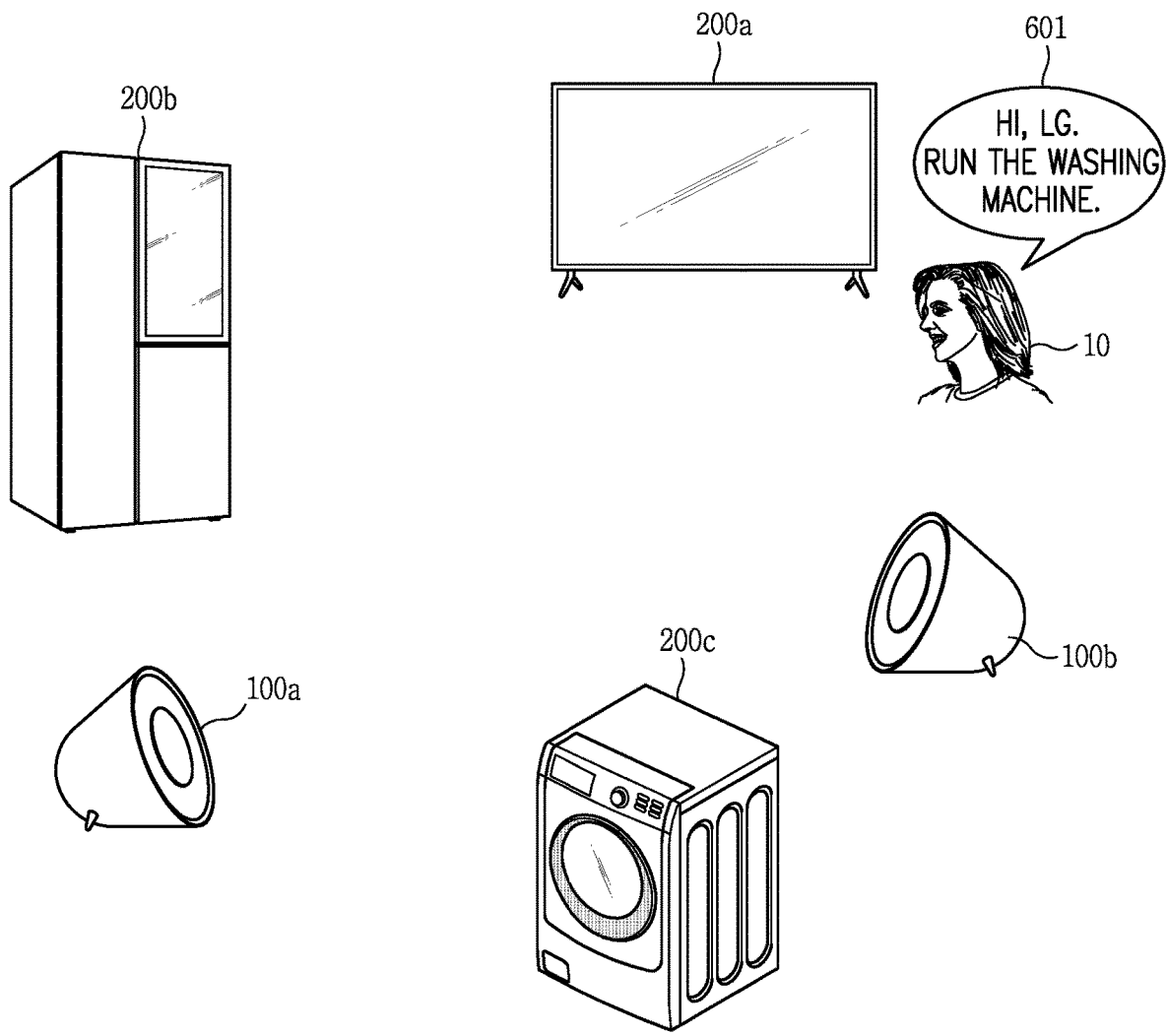
FIGS. 6A and 6B are conceptual views illustrating processes of FIG. 5.
Figure 6B:
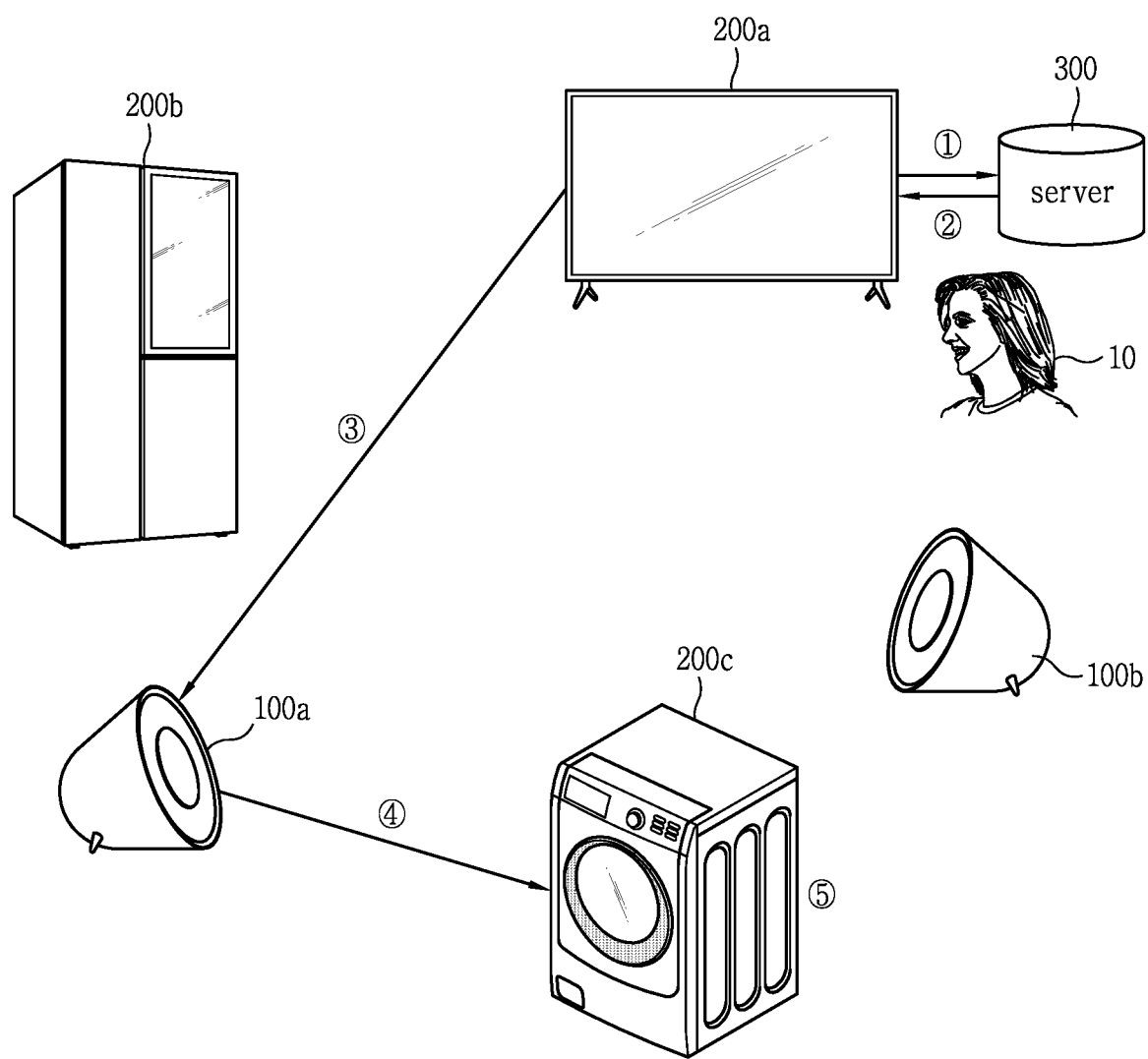

Hereinafter, FIG. 5 is a representative flowchart illustrating a method of operating an electronic device in accordance with an embodiment of the present disclosure, and FIGS. 6A and 6B are conceptual views illustrating processes of FIG. 5.

First, referring to FIG. 5, an electronic device according to the present disclosure performs a process of obtaining profile information related to a plurality of artificial intelligence (AI) devices (S10).

Here, the profile information includes hardware performance of each AI device, an input/output device, and a list of executable commands. The profile information may further include an installation position and identification (ID) information in relation to each AI device.

When a plurality of electronic devices exists in the same network area, the plurality of electronic devices may share the profile information related to the plurality of AI devices. To this end, all the electronic devices 100 existing in the same network area receive, in a broadcasting manner, profile information related to all the AI devices including newly added AI devices.

As described above, when a plurality of electronic devices exists in the same network area, one of the plurality of electronic devices is elected as a master device.

To this end, in one embodiment, the control unit 180 of the electronic device 100 receives profile information related to at least one AI device existing in the same network area, and a main body of the electronic device 100 generates and stores a list of executable commands which match profile information to be explained later, according to a preset reference, in response to being elected as the master device.

Herein, the preset reference may be associated with a network state or hardware performance. For example, a high-performance electronic device exhibiting a good network state and/or low downtime, for example, may be elected as a master device from among a plurality of electronic devices.

Next, the electronic device (elected as the master device) stores the obtained profile information and a list of executable commands that match the profile information, so as to register a plurality of AI devices existing in the same network area (S20).

As such, when an electronic device performs the registration process for the plurality of AI devices existing in the same network area, the electronic device becomes a 'master device'.

If there is only one electronic device in the same network area, the electronic device is directly set to a master device. However, when a plurality of electronic devices exists in the same network area, a process of electing a 'master device' as described above is performed.

Thereafter, it is determined whether or not a voice including a preset wake-up word (e.g., 'Hello', 'Hi, LG', 'Hi, Clova', etc.) is input into one (hereinafter, 'first AI device') of the AI devices registered in the master device (S30). To this end, the user may speak to an arbitrary AI device close to his/her current position.

Specifically, when the user utters a voice (speech) including a preset wake-up word, the plurality of AI devices that has received the voice recognizes the wake-up word and then shares voice information related to the uttered voice (e.g., a volume and a signal to noise ratio (SNR) of the received voice). Then, an AI device which has received the voice information in a good state is decided to analyze the meaning of the voice.

When the voice is received by the first AI device, the electronic device 100 receives an execution command corresponding to the received voice from the first AI device (S40).

On the other hand, if a voice is received by the main body of the electronic device other than the first AI device, or if an execution command corresponding to the received voice can be executed in the first AI device, a process 'A' is performed.

Here, the process 'A' may be one of two processes as follows.

If a voice is received by the main body of the electronic device, the electronic device transmits the voice data to the voice recognition server for semantic analysis of the voice, and executes an execution command corresponding to the semantic analysis received from the voice recognition server or transfers the execution command to another appropriate AI device.

When the execution command corresponding to the received voice can be executed by the first AI device, the first AI device transmits the voice data to the voice recognition server for semantic analysis of the corresponding voice, and executes by itself an execution command corresponding to the semantic analysis received from the voice recognition server.

On the other hand, when the electronic device (master device) receives the execution command corresponding to the received voice from the first AI device, the control unit 180 searches for an AI device (hereinafter, 'second AI device'), which can execute the execution command, among all the AI devices registered in the master device, based on the stored profile information and the list of executable commands.

The control unit 180 transmits the execution command to the searched second AI device (S60).

Referring to FIGS. 6A and 6B, an AI server (not shown) (which may be replaced by the learning data unit 130) activated by a preset wake-up word, a plurality of AI devices 200a to 200c set to receive a user voice 601 including the preset wake-up word, and a plurality of electronic devices 100a and 100b performing communication with the plurality of AI devices 200a to 200c may be arranged in the same network area.

The user may speak a preset wake-up word (e.g., 'Hi, LG') toward a first AI device 200a close to his/her current position, and a voice command (e.g., 'Run the washing machine') for a specific AI device.

In order to analyze the meaning of the voice command, the first AI device 200a transmits voice data including the voice command to the voice recognition server 300 (①). The voice recognition server 300 analyzes the meaning of the voice command and provides a corresponding execution command ('washing machine driving command') to the first AI device 200a (②).

On the other hand, the plurality of electronic devices 100a and 100b may include a master device 100a which stores profile information related to the plurality of AI devices 200a to 200c and a list of executable commands corresponding to the respective profile information, and a slave device 100b which merely stores the profile information related to the plurality of AI devices 200a to 200c.

The master device 100a receives the execution command ('washing machine driving command') corresponding to the user voice 601 from the first AI device 200a (③), and searches for at least one AI device, namely, an AI washing machine 200c to perform the execution command, based on the stored profile information and list. Thereafter, when the execution command ('washing machine driving command') is transmitted to the searched AI washing machine 200c (④), the operation of the AI washing machine 200c is started (⑤).

On the other hand, in one example, when the first device receives a voice including the preset wake-up word and an execution command corresponding to the voice is determined to be executable directly by the first AI device 200a, the execution command is not transferred to the master device 100a.

That is, when the current AI device can process the execution command, the corresponding AI device performs an operation corresponding to the execution command. In addition, in one example, operation result information of the first AI device 200a may be received by the main body of the master device 100a.

On the other hand, in one example, when a plurality of AI devices to execute an execution command is searched for, the execution command may be transmitted so that it can be executed by an AI device located adjacent to the current position of the user.

In this case, the AI device that is adjacent to the current position of the user is the first AI device when the first AI device is included in the searched AI devices. This is because the first AI device has received the user voice, it may be estimated to be located close to the current position of the user.

When the first AI device is not included in the searched AI devices, the AI device adjacent to the current position of the user is an AI device corresponding to the searched AI device among AI devices adjacent to the first AI device.

In addition, in one example, even when an AI device to perform a command is not explicitly included in the execution command (e.g., 'Turn on.'), the first AI device may be selected as the AI device close to the current position of the user.

In one example, after the execution command is transmitted to the second AI device as described above, when an operation corresponding to the execution command is performed in the corresponding AI device, the control unit 180 may receive result information of the operation.

In this case, the received result information may be displayed on the electronic device. A display method may be any one of a voice output, a screen output, and an LED output.

As described above, according to the present disclosure, in an environment in which a plurality of AI devices coexists, a quick and easy control for a specific AI device can be performed through a seamless voice command without a user having to consider type and position of an electronic device or a home appliance to control and additionally without having to designate a device to control clearly.

Figure 7A:
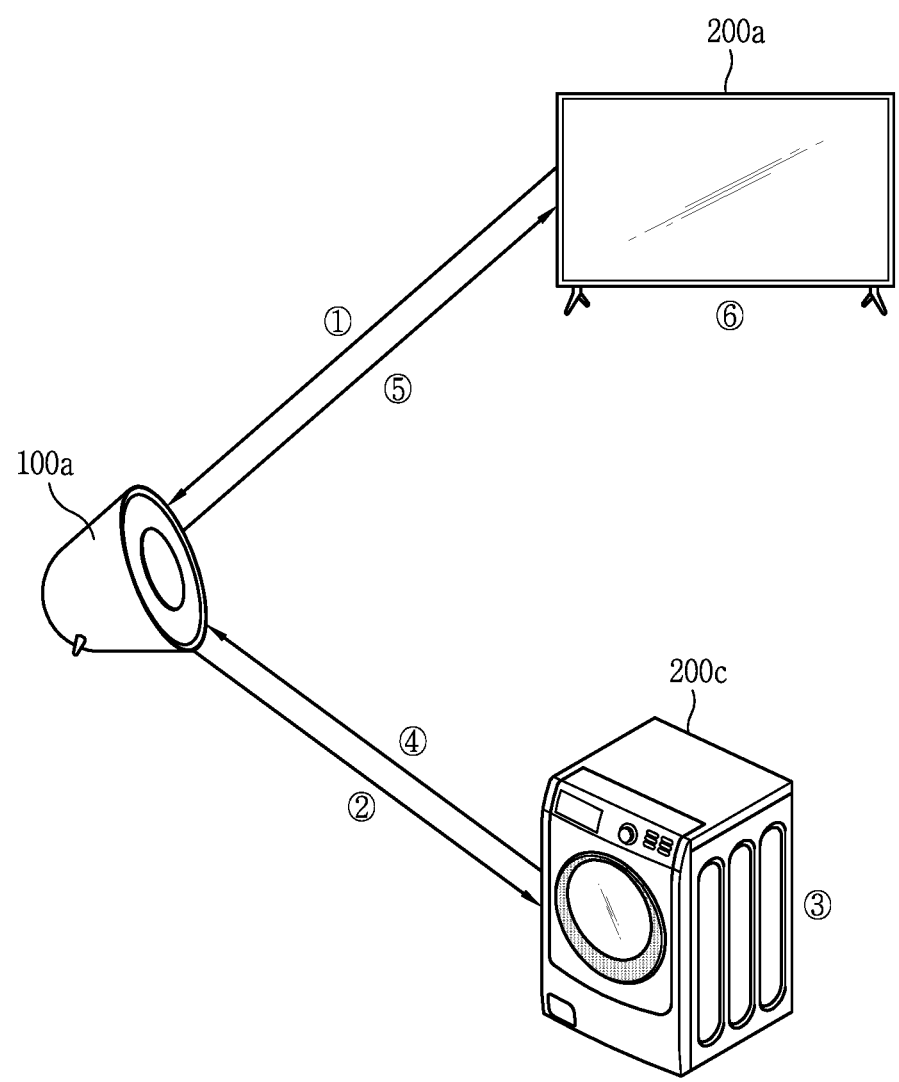
FIGS. 7A and 7B are different exemplary views illustrating operations of a plurality of artificial intelligence devices when an electronic device according to the present disclosure receives an execution command which requires a response.
Figure 7B:
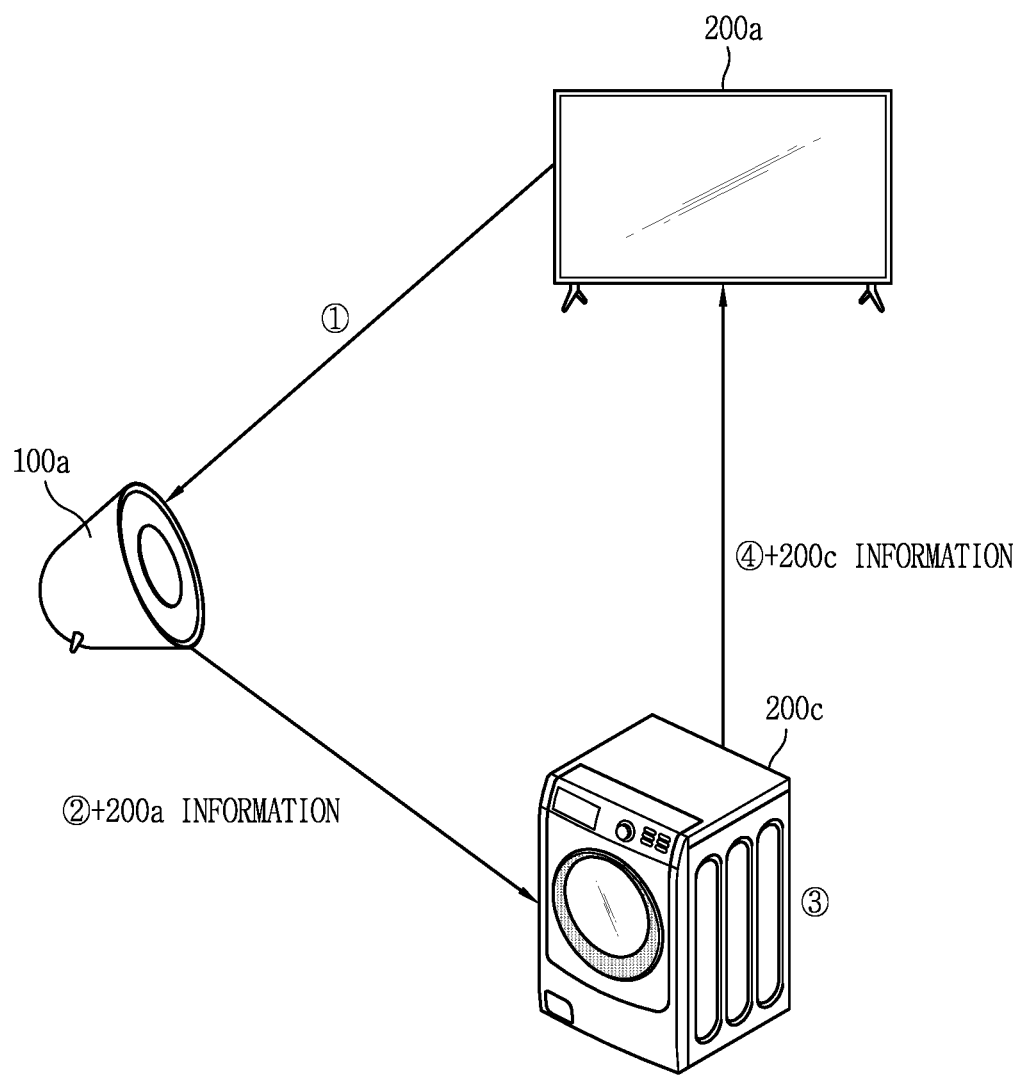

Hereinafter, FIGS. 7A and 7B illustrate different examples for illustrating operations of a plurality of AI devices when an execution command requiring a response is received, in an electronic device according to the present disclosure.

In detail, FIG. 7A illustrates an example in which a response to an execution command is transmitted to the first AI device via the master device 100a. FIG. 7B illustrates an example in which a response to an execution command is transmitted from the second AI device directly to the first AI device without passing through the master device 100a.

First, referring to FIG. 7A, the first AI device 200a transmits an execution command to the master device 100a (①). The master device 100a searches for an AI device which is capable of executing the execution command, and transmits the execution command to the second AI device 200c (②). When the second AI device 200c performs an operation according to the execution command (③), an execution result is transmitted to the master device 100a (④). The master device 100a transmits the execution result to the first AI device 200a which has first transmitted the execution command (⑤). The first AI device 200a displays the received execution result on a screen (⑥).

Next, referring to FIG. 7B, the first AI device 200a transmits an execution command to the master device 100a (①). The master device 100 searches for an AI device which is capable of executing the corresponding execution command, and transmits information related to the first AI device 200a, together with the execution command, to the second AI device 200c (②)+200a information).

To this end, when transmitting the execution command to the searched second AI device 200c, the control unit 180 attaches profile information related to the first AI device 200a, which has transmitted the execution command corresponding to the voice, to a first packet which includes the execution command.

When the second AI device 200c performs an operation according to the execution command (③), an execution result of the operation is transmitted to the first AI device 200a based on the profile information included in the first packet. At this time, the second AI device 200c transmits information related to itself together with the execution result of the operation ((④)+200c information).

To this end, the control unit 180 may control the second AI device 200c, which has received the first packet, to transmit its own profile information by attaching the profile information to a second packet which includes the execution result of the operation corresponding to the execution command. Also, for this purpose, the first packet may include a command for the second AI device 200c to generate the second packet and transmit the generated second packet to the first AI device 200a.

As such, in the present disclosure, the user can confirm a control result through an AI device close to the current position of the user, without a need to input a voice command directly to a specific AI device or to move to input such voice command to a master device.

Figure 8A:
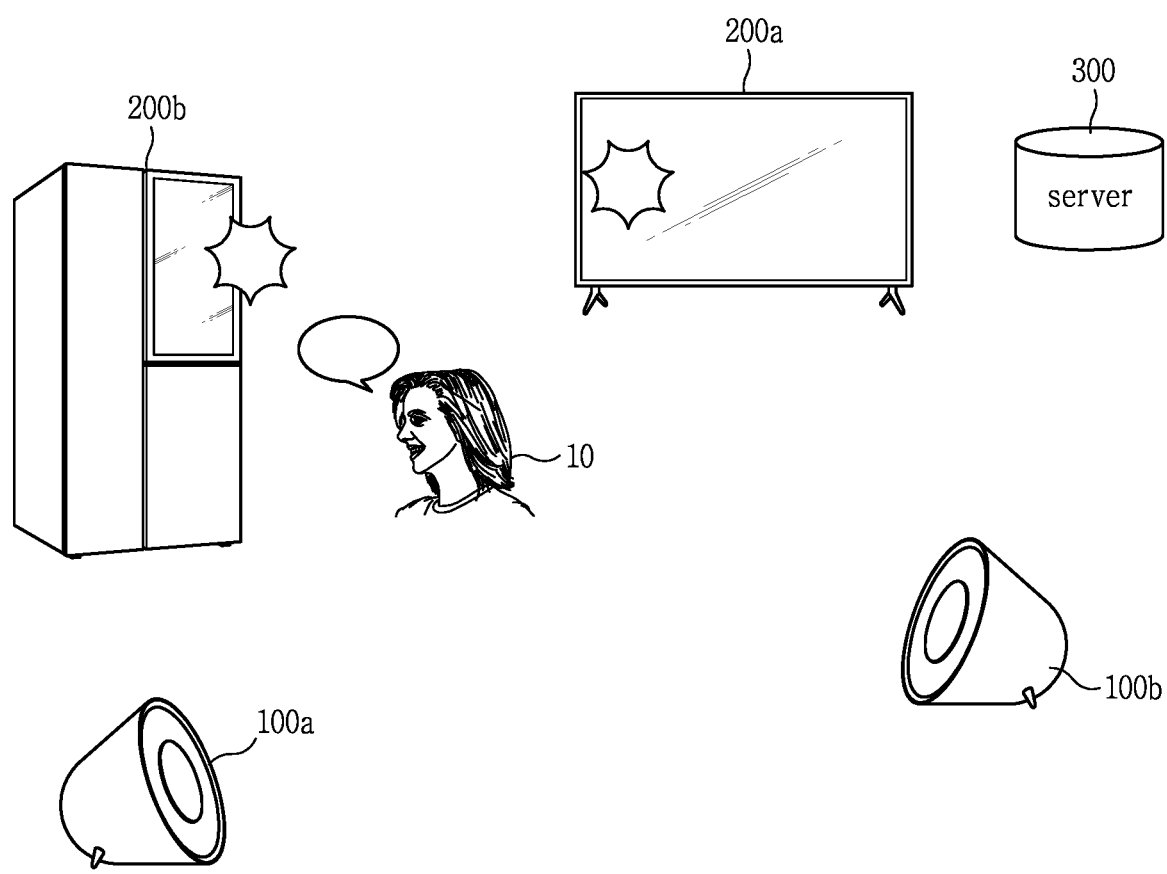
FIG. 8A is a conceptual view illustrating a processing operation when a user voice is received by a plurality of artificial intelligence devices in the present disclosure.
Figure 8B:
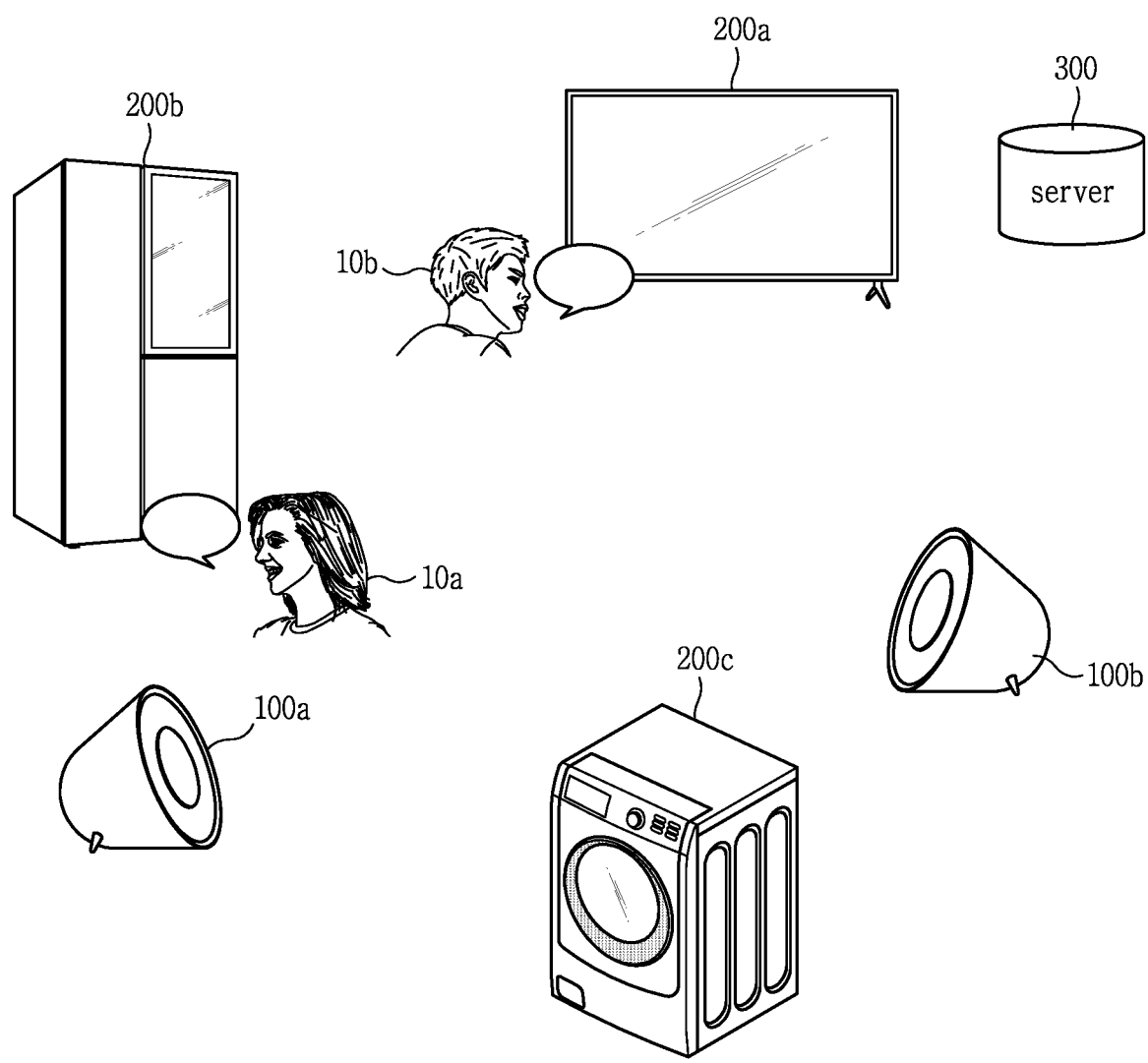
FIG. 8B is a conceptual view illustrating a processing operation when a plurality of user voices is received.

Hereinafter, FIG. 8A is a conceptual view illustrating a processing operation when a user voice is received by a plurality of AI devices in the present disclosure, and FIG. 8B is a conceptual view illustrating a processing operation when a plurality of user voices is received.

First, referring to FIG. 8A, a plurality of AI devices 200a and 200b may receive a voice including a preset wake-up word spoken by a single user 10.

In this case, one AI device may be selected based on a comparison result of voice reception states, and an execution command corresponding to the voice may be received from the selected AI device. At this time, even if the user's current position is closer to the AI refrigerator 200b than the AI TV 200a, if the voice reception state of the AI TV 200a is better, the AI TV 200a is the first AI device for processing the corresponding voice.

Next, referring to FIG. 8B, a case where a plurality of users 10a and 10b utter different voices including a preset wake-up word. In this case, a plurality of execution commands corresponding to each voice may be transmitted to the master device, respectively, from a plurality of AI devices that are close to the respective users who have spoken the different voices.

When the plurality of execution commands is transmitted to the master device as described above, the control unit 180 may attach IDs for the plurality of AI devices, which match the plurality of execution commands, respectively, at the time of transmitting the plurality of execution commands to the searched AI devices.

For example, in FIG. 8B, an execution command received from the AI refrigerator 200b is delivered to the second AI device in a manner that a refrigerator ID is attached to the execution command. And, a TV ID is attached to the execution command received from the AI TV 200a and the execution command is then transferred to the second AI device. Thus, even if the destinations for a plurality of execution commands are the same, no error or confusion occurs.

Figure 9A:
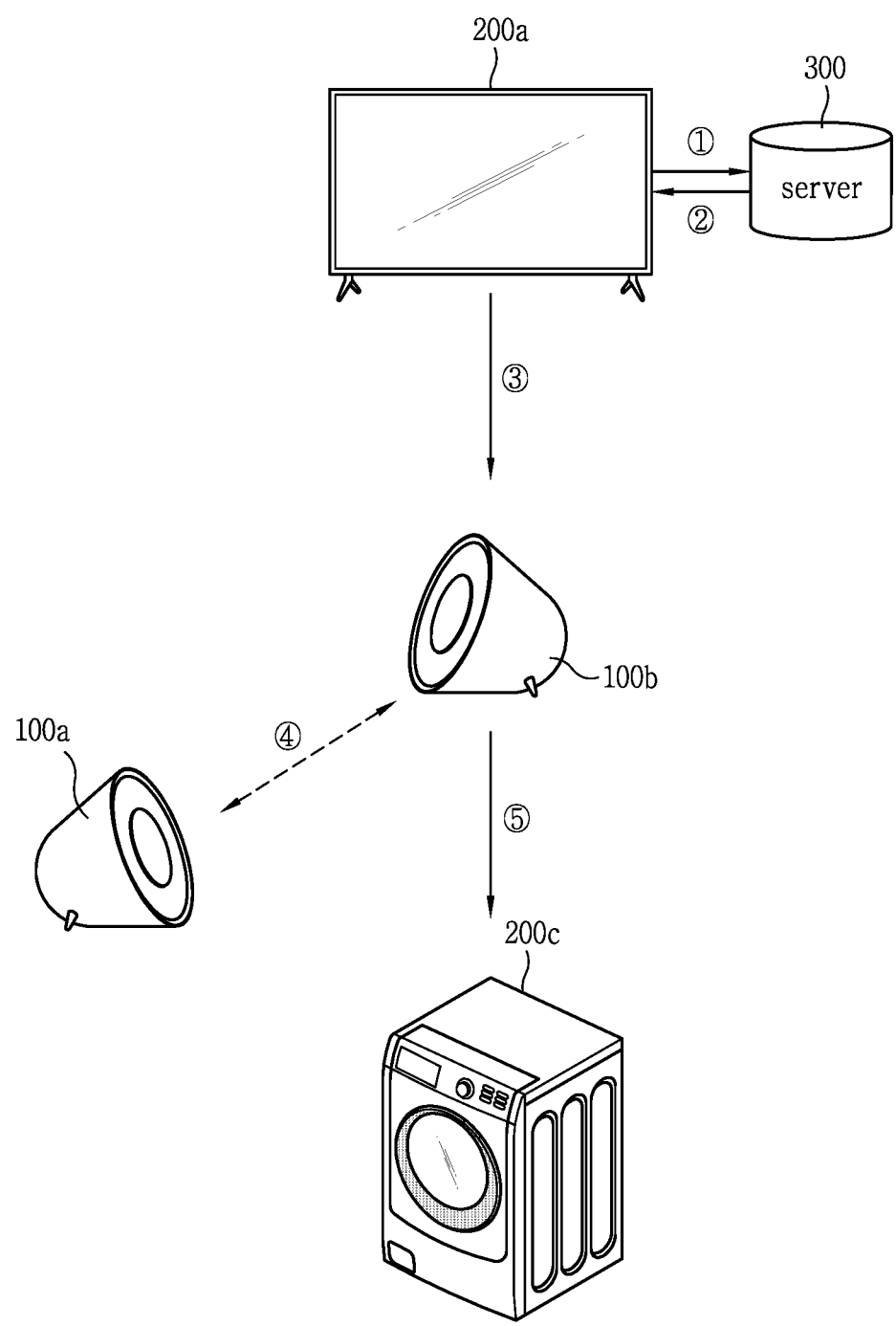
FIG. 9A is a conceptual view illustrating a processing operation for an execution command when the execution command transmitted from a first artificial intelligence device is received by a slave device.

Hereinafter, FIG. 9A is a conceptual view illustrating a processing operation for an execution command when the execution command transmitted from a first AI device is received by a slave device, and FIG. 9B is a conceptual view illustrating a processing operation when an AI device to perform an execution command is not detected in the same network area.

Referring to FIG. 9A, since the slave device 100b also has profiles for the plurality of AI devices 200a and 200c, the slave device 100b may receive execution commands ① and ② generated by the first AI device 200a (③).

In this case, the slave device 100b transmits query information to the master device 100a since there are not a list of executable commands and profiles for AI devices matched to them. In addition, the slave device 100b may receive the profile information and the list (which may be encrypted at this time) from the master device 100a or may transmit the query information by including an execution command and a profile for the first AI device 200a in the query information.

In the former case, the slave device 100b may act as like a master device.

In the latter case, the slave device 100b receives an execution command including a searched destination (e.g., a washing machine) from the master device 100a. In either case, the slave device 100b and the master device 100a interact with each other ((④)).

Thereafter, the execution command is transmitted from the slave device 100b to a second AI device 200c (⑤). In this case, the slave device 100b may transmit operation result information of the second AI device 200c to the master device 100a.

Referring to FIG. 9B, a left side shows a first network area 910 and a right side shows a second network area 920.

Referring to FIG. 9B, it shows a case in which a second AI device to execute an execution command in a first network area cannot be searched for. In this case, the master device 100a existing in the first network area transmits an execution command received from the first AI device 200a to a master device 100c in a second network area selected according to a preset reference.

In this case, the predetermined reference for selecting the second network area may be, for example, a case where an area is close to the first network area and is a communication-available area.

The master device 100c in the second network area searches for a second AI device 200e to perform the received execution command, based on profile information related to AI devices 200d and 200e existing in the second network area and a list of executable commands matched to the profiles. Then, the master device 100c may transfer the execution command to the searched second AI device 200e. Operation result information of the second AI device 200e is transmitted to the master device 100a in the first network area via the master device 100c.

As described above, according to the present disclosure, in an environment in which a plurality of AI devices coexists, a quick and easy control for a specific AI device can be performed through a seamless voice command without a user having to consider type and position of an electronic device or a home appliance to control and additionally having to designate a device to control clearly. Also, in the present disclosure, the user can confirm a control result through an AI device close to the current position of the user, without a need to input a voice command directly to a specific AI device or to move to input such voice command to a master device. This may result in further enhancing user convenience and usability of a plurality of AI devices.

The present disclosure described above can be implemented as computer-readable codes on a program-recorded medium. The computer readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). In addition, the computer may also include the control unit 180 of the terminal. The above detailed description should not be limitedly construed in all aspects and should be considered as illustrative. The scope of the present disclosure should be determined by rational interpretation of the appended claims, and all changes within the scope of equivalents of the present disclosure are included in the scope of the present disclosure.

The invention claimed is:

1. An electronic device, comprising:
  a voice receiving unit configured to receive a voice;
  a communication unit configured to perform communication with an artificial intelligence (AI) server set to be activated by a preset wake-up word; and a control unit configured to acquire profile information including identification (ID) information through communication with at least one artificial intelligence device communicating with the artificial intelligence server, and register the at least one artificial intelligence device by storing the acquired profile information and a list of executable commands matched to the profile information, wherein the control, unit is further configured to:

in response to an execution command corresponding to the voice being received, search for an artificial intelligence device to perform the execution command based on the profile information and the list;

transmit the execution command to the searched artificial intelligence device by attaching profile information related to a first artificial intelligence device, which has transmitted the execution command corresponding to the voice, to a first packet including the execution command, and control a second artificial intelligence device, which has received the first packet, to transmit profile information, regarding the second artificial intelligence device, to the first artificial intelligence device by attaching the profile information on the second artificial intelligence device to a second packet including result information related to an operation corresponding to the execution command.

2. The electronic device of claim 1, wherein the control unit receives profile information related to at least one artificial intelligence device existing within a predetermined area, and stores the profile information and a list of executable commands matched to the profile information, in response to a main body being selected as a master device according to a preset reference.

3. The electronic device of claim 1, wherein the transmission of the execution command is not performed when it is determined that the voice including the preset wake-up word is received by the registered artificial intelligence device and the registered artificial intelligence device is capable of performing the execution command corresponding to the voice.

4. The electronic device of claim 1, wherein the control unit transmits the execution command to an artificial intelligence device close to a current position of a user so that the artificial intelligence device performs the execution command when a plurality of artificial intelligence devices to perform the execution command is searched for.

5. The electronic device of claim 1, wherein the control unit receives result information related to an operation corresponding to the execution command from the searched artificial intelligence device after the execution command is transmitted to the searched artificial intelligence device.

6. The electronic device of claim 5, wherein the control unit transmits the result information to an artificial intelligence device that has transmitted the execution command corresponding to the voice.

7. The electronic device of claim 1, wherein one of a plurality of artificial intelligence devices, when the voice including the preset wake-up word is received by the plurality of artificial intelligence devices, is selected based on a comparison result of voice reception states, and the execution command corresponding to the voice is received from the selected artificial intelligence device.

8. The electronic device of claim 1, wherein when a plurality of different voices including the preset wake-up word is received, a plurality of execution commands corresponding to the respective voices is transmitted from a plurality of artificial intelligence devices that is close to respective users who have spoken the plurality of different voices, and the control unit transmits the plurality of execution commands to the searched artificial intelligence device by adding identifications (IDs) for a plurality of artificial intelligence devices matched to the plurality of execution commands, respectively.

9. A system including a plurality of artificial intelligence devices, the system comprising:

a plurality of artificial intelligence devices configured to receive a voice including the preset wake-up word;

a master electronic device configured to acquire profile information including identification (ID) information related to the plurality of artificial intelligence devices through communication with the plurality of artificial intelligence devices, and register the plurality of artificial intelligence devices by storing the acquired profile information and a list of executable commands matched to the profile information; and a slave electronic device configured to acquire profile information related to the plurality of artificial intelligence devices through communication with the plurality of artificial intelligence devices, wherein the master electronic device, in response to an execution command corresponding to the voice being received, searches for at least one artificial intelligence device to perform the execution command based on the profile information and the list, wherein at least one artificial intelligence device to perform the execution command is searched for by receiving the stored profile information and the list from the master electronic device, when the execution command corresponding to the voice is transferred to the slave electronic device, and wherein the slave electronic device receives result information related to an operation corresponding to the execution command from the searched artificial intelligence device and transmits the result information to the master electronic device.

10. The system of claim 9, wherein the execution command is transmitted to a master electronic device in another network area, when the master electronic device cannot search for at least one artificial intelligence device to perform the execution command based on the stored profile information and the list.

11. A method for operating an electronic device, the method comprising:

acquiring profile information including identification (ID) information through communication with at least one artificial intelligence device;

registering the at least one artificial intelligence device by storing the acquired profile information and a list of executable commands matched to the profile information;

receiving an execution command corresponding to a voice including a preset wake-up word from the at least one artificial intelligence device when the voice is received by the at least one artificial intelligence device;

searching for an artificial intelligence device to perform the execution command based on the profile information and the list;

transmitting the execution command to the searched artificial intelligence device by attaching profile information related to a first artificial intelligence device, which has transmitted the execution command corresponding to the voice, to a first packet including the execution command; and controlling a second artificial intelligence device, which has received the first packet, to transmit profile information, regarding the second artificial intelligence device, to the first artificial intelligence device by attaching the profile information on the second artificial intelligence device to a second packet including result information related to an operation corresponding to the execution command.

* * * * *